S. Lagowitz,
Traveling Bag,
No. 2,035. Reissued July 25, 1865.
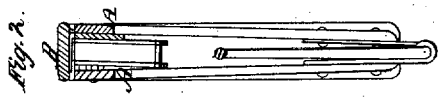
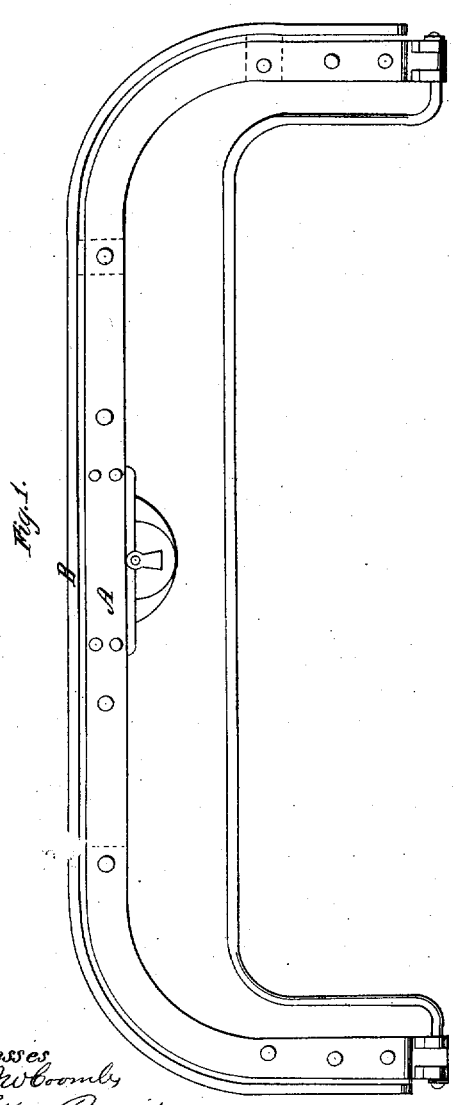
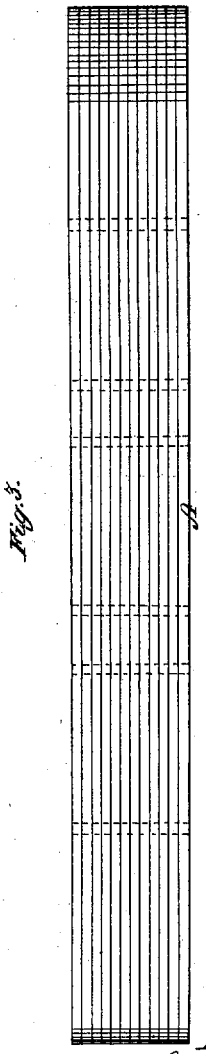
Witnesses
J. W. Coombs
Geo Reed
Inventor
Samuel Lagowitz
per Munn & Co
attorneys.
N. PETERS, PHOTO-LITHOGRAPHER, WASHINGTON, D. C.

UNITED STATES PATENT OFFICE.

SAMUEL LAGOWITZ, OF NEWARK, NEW JERSEY.

IMPROVEMENT IN CARPET-BAG FRAMES.

Specification forming part of Letters Patent No. 39,152, dated July 7, 1863; Reissue No. 2,035, dated July 25, 1865.

*To all whom it may concern:*

Be it known that I, SAMUEL LAGOWITZ, of Newark, in the county of Essex and State of New Jersey, have invented a new and Improved Carpet-Bag Frame; and I do hereby declare that the following is a full, clear, and exact description thereof, which will enable other skilled in the art to make and use the same, reference being had to the accompanying drawings, forming part of this specification, in which—

Figure 1 represents a side elevation of this invention. Fig. 2 is a transverse vertical section of the same. Fig. 3 is a plan or top view of one of the side strips, showing the manner in which the same is prepared when made of wood.

Similar letters of reference indicate like parts.

This invention consists in a frame for carpet-bags, with a wooden cover, in such a manner that a cheaper frame is produced than the ordinary iron frame, and a frame which is less liable to get out of order, which is stronger, more durable, easier to transport, and easier to manufacture.

Ordinary frames for carpet-bags are made wholly of metal, which is not only expensive, but has other serious disadvantages. My improved frame is made of side pieces or jaws, A, of wood or metal, and of a cover, B, of wood.

For the purpose of manufacturing the side pieces or jaws, I use by preference hickory wood, and cut it up in pieces, such as shown in Fig. 3, each piece being sufficient to make twelve (more or less) jaws. Previous to cutting these pieces up they are bent to the desired shape by an ordinary device for bending wood, and then all the holes are drilled through the whole piece, as indicated in dotted lines in Fig. 3. The jaws are then cut off by means of a saw, and it is obvious that the whole number cut from the same piece of wood are all exactly alike, and the holes exactly in the same position, so that said pieces can be interchanged at pleasure, and, furthermore, by this operation much time is saved as compared with the manufacture of iron jaws. The wooden jaws are stronger and more durable than iron, they have elasticity enough to reassume their original position when bent, and they are not so easily sprung apart as the iron jaws. It is also easier to fasten the leather or other fabric from which the carpet-bag is made to the wooden jaws than to those of iron, although I do not wish to confine myself in the manufacture of my frame strictly to wooden jaws.

The covers B of my frames are made of simple splints of hickory or other suitable wood bent to the desired shape, and secured to one of the side-pieces or jaws by stays or brackets *a* in the ordinary manner. This cover is preferable to the common iron cover, because it is not necessary to cover the wood with cloth previous to attaching the fabric thereto, which is indispensable with iron covers in order to conceal the ends of the rivets used in fastening the same to the stays or brackets. The wooden cover is also lighter, more durable, and stronger than the iron cover, and it can be used in combination with iron or wooden jaws with equal advantage.

I do not claim, broadly, the making of the jaws of carpet-bags of wood; but

I claim as new and desire by secure by Letters Patent—

Having the cover B made of elastic wood and attached to one of the jaws A by stays or brackets, all as herein shown and described.

SAM. LAGOWITZ.

Witnesses:
F. MAASS,
E. SCHWARZWALD.